G. E. HOWARD.
METHOD OF FEEDING GLASS.
APPLICATION FILED JULY 22, 1916.

1,315,668.

Patented Sept. 9, 1919.
2 SHEETS—SHEET 1.

INVENTOR
George E. Howard
By Story, Frame Powell
Attys

UNITED STATES PATENT OFFICE.

GEORGE E. HOWARD, OF BUTLER, PENNSYLVANIA.

METHOD OF FEEDING GLASS.

1,315,668.   Specification of Letters Patent.   Patented Sept. 9, 1919.

Application filed July 22, 1916. Serial No. 110,676.

*To all whom it may concern:*

Be it known that I, GEORGE E. HOWARD, a citizen of the United States, and resident of Butler, in the county of Butler and State of Pennsylvania, have invented a new and useful Improvement in Methods of Feeding Glass; and I do hereby declare the following to be a full, clear, and exact description thereof.

The invention herein described relates to certain improvements in feeding glass from tanks, furnaces or other supply reservoirs to molds or other shaping devices.

Particularly it relates to that class of feeders known as flow feeds, whereby glass is fed through an orifice or over an opening by gravity.

More specifically it relates to that class of flow feeds in which the flow discharges glass in masses of predetermined form, as opposed to flow feeds discharging the glass in unformed masses.

The object of my invention is to provide a method of feeding glass in masses of predetermined quantity and of suitable shape for entering the mold.

A further object is to control the shape of the mass or drop without checking or reversing the flow of glass in the supply reservoir, or at the orifice.

A still further object is to furnish a method of regulation whereby changes in level of the reservoir or change in temperature and viscosity of the glass can be quickly equalized. A still further object is to provide a positive method for incorporating the chilled cutting mark within the body of the next succeeding drop and thereby equalize its temperature.

A still further object is to control the shape and size of the drop without variation of pressure anywhere in the line of flow before it escapes at the outlet.

Figure 1:
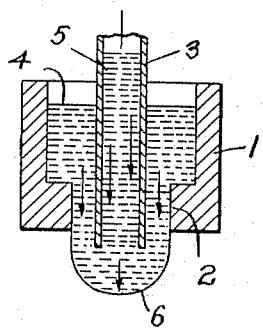
Figure 2:
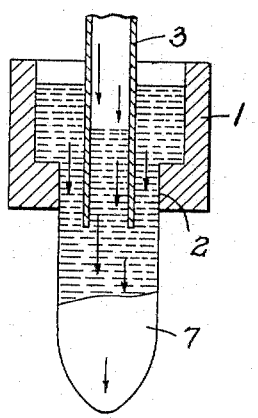
Figure 3:
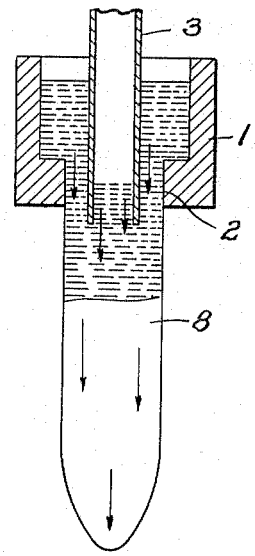
Figure 4:
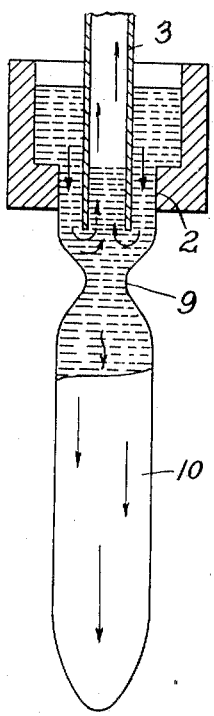
Figure 5:
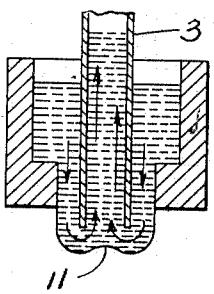
Figure 10:
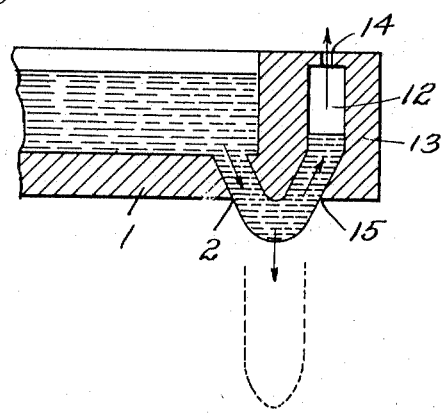
Figure 6:
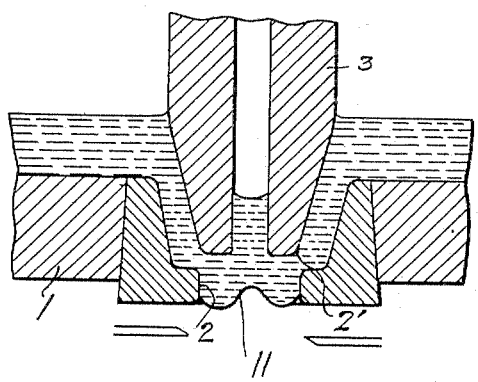
Figure 9:
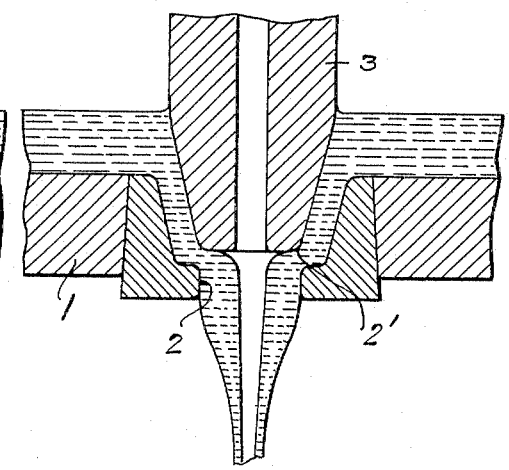
Figure 7:
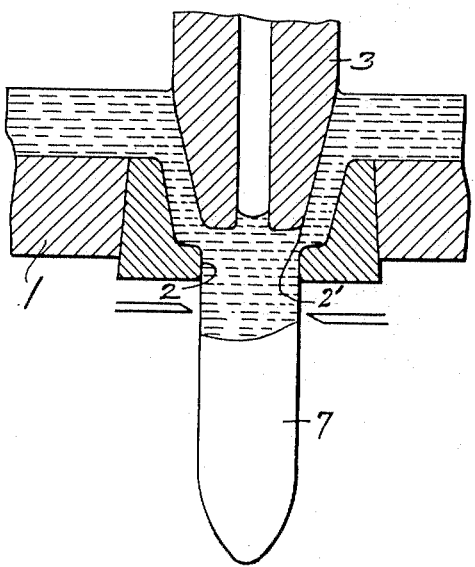
Figure 8:
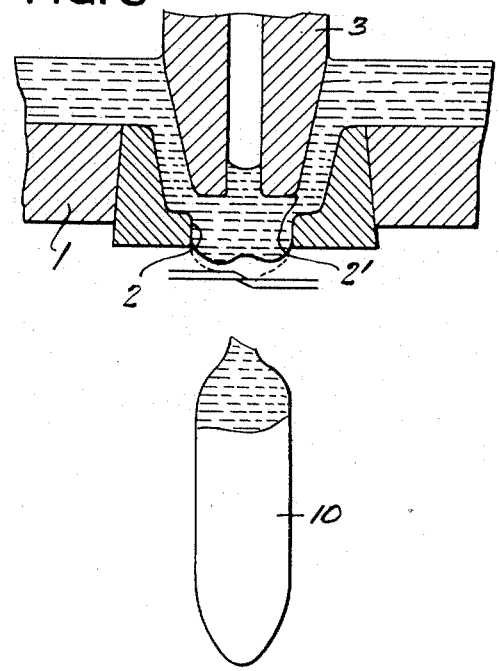

Other objects and advantages of the invention will be apparent from the following description taken with the accompanying drawings, in which Figure 1 is a sectional view of a vessel containing melted glass, indicating a step in the feed of glass from the vessel; Fig. 2 is a view similar to Fig. 1, showing a further step in the feed; Fig. 3 illustrates a still further step; Fig. 4 illustrates the method of decreasing the section of the mass preparatory to cutting off the mass of glass fed; Fig. 5 illustrates the flowing into the auxiliary reservoir of the glass just after the globular drop has been cut off; Figs. 6 to 8, inclusive, show different stages in the operation of a modified form of the invention; Fig. 9 indicates the normal gravity flow from the device when the invention is not in operation; and Fig. 10 illustrates a further possible modification of the invention.

At temperatures necessary for working, molten glass is a stiff viscous fluid tenaciously adhering to any hot material. The flow starts by forming a half globular drop at the orifice of the vessel, next its co-hesion to the edges of the orifice causes the drop to pull downward at the center, usually forming a drop, the upper end of which adheres to the orifice and the center pulls away to a small stream or thread and this attenuated condition remains constant. Glass resembles all other viscous fluids in this respect, but shows a very great contraction in area of stream.

If the head or level of the glass in the supply reservoir be increased or more pressure applied to the surface of the glass, this contraction below the orifice will be reduced. This is due to the fact that the adherence to the edge of the orifice is so much greater than the tension of the glass particles to each other, and greater pressure forces more glass through the center of the drop without increasing to any great degree the flow at the edges or outer sides of the drop. Conversely, by decreasing pressure on the head or level of the glass, contraction of the stream is increased, and by varying the rate of flow, it is possible to so expand or contract the section of stream near the orifice as to make it resemble within narrow limits, a predetermined form. Also by cutting off the globule of glass close to the orifice the contracted section (or the tail part above the shears) will be drawn up into the half globular drop at the orifice by reason of the law that a drop of any fluid tends to assume a globular form up to the disrupting point, and corrects any deviation of form by drawing to it the distorted part by molecular attraction of its particles. This forms independent masses without supporting the stream on the shears or other cold members.

Various methods have been proposed and some embodied this principle of intermittent flow caused by variation of pressure in the glass within the supply reservoir. In one of these old methods, there is a plunger within the body of the glass in the supply reservoir just above the orifice. By moving this plunger down, flow of glass through the orifice is accelerated and tends to fill up the central portion of the globule and prevent contraction or attenuation of the stream from the globule. When in using this method, it is desired to contract the globule near the orifice in order to cut it off through its narrowest portion, this plunger is raised or retracted from the orifice thus decreasing the pressure of the glass at the orifice and checking the flow.

There are four practical objections inherent in this principle of operation, and consequently inherent in any particular method using this principle. First,—the force applied is only partially available for the reason that the reservoir is open at its source of supply, and the pressure tends to partly dissipate itself or expand itself in backing the glass into the tank or other containing vessel, and thus the force spends itself largely in inertia.

Second,—checking rate of flow and even in some cases reversing it in the orifice tends to cause clogging.

Third,—owing to the very imperfect action of forces applied to the mass of glass, the cut off mark never becomes incorporated in the mass of glass forming the next drop, but remains on the lower surface and causes cracks and unfinished parts to the finished ware.

Fourth,—the forces accelerating the flow at one time are balanced by an equal checking force, and thus the average flow is not different from the normal flow when these actions are suspended. This leaves no provision for changing the flow to equalize any changes in the general level of supply source or change in the temperature or viscosity of the glass, both of which cause great changes in the normal flow.

In the method employed in carrying out my invention, no forces operate upon the glass in its line of flow from the tank or other source of supply to the discharge opening, but instead forces act upon the glass at or beyond the orifice, and act in such a way as to accelerate the normal flow and not to stop it, so that by varying the amount of these forces, variation in the normal rate of flow is obtained.

This acceleration at or beyond the orifice is produced by the force of tension among the particles of the glass, and is applied after the glass leaves the orifice. This force of tension is very great in thick viscous liquids, such as glass at working temperature.

The force of varying pressure is applied to the drop after it is formed and is used to correct the shape of the globule independent of the force of gravity, which is the sole force ordinarily used, which acts to shape the drop at or after it has passed the opening.

The figures of the drawing herewith illustrate some of the constructions for carrying out one method of employing the principle of my invention. In each of the figures, 1 represents the vessel containing the glass, said vessel having an opening 2 at the bottom and of any desired diameter suitable to the free flowing of the liquid glass. Within this vessel is mounted a tube or pipe 3, whose outer wall may constitute part of containing wall of the main reservoir, which in ordinary cases may project down to a point possibly a little beyond the lower end of the opening of the vessel, or it may even be elevated somewhat within the opening, and even slightly above the bottom of the vessel (as shown in Figs. 6 to 8). The orifice is doughnut-shaped, its outer diameter being defined by the circular opening in the bottom of the reservoir, and its inner diameter defined by the circular end of the tube 3. The area of this doughnut-shaped orifice 2' must be less than the area of the circular opening in the bottom of the main reservoir, so that after glass issues therefrom, it is free to fall by the natural action of gravity. The glass will not flow into the auxiliary reservoir, but must be drawn up into it by the force of suction applied within the auxiliary reservoir. This pipe 3 may be connected in any suitable manner with a source of vacuum, and also so connected up that the vacuum in the pipe may be reduced and even slight pressure applied within the pipe. When vacuum or suction is applied, the glass is drawn up inside the tube, as shown at 5, Fig. 1. It is to be understood that the relative diameters of the opening 2 and of the pipe 3 are such that the sucking up action into the pipe 3 cannot and does not stop normal flow of the glass down through the orifice 2' between the walls of said opening 2 and the walls of the pipe 3. In other words, the parts are so proportioned that no matter how rapidly the glass may be sucked up into the pipe 3, this has no tendency to check or retard the flow of the glass down through the orifice 2' between the walls thereof and the wall of the pipe. On the contrary, the only effect which sucking up of the glass into the pipe 3 may have is, that flow of the glass out through the opening of the vessel as distinguished from the orifice 2' may be thereby accelerated, but it is never checked.

In describing the operation of the forms of apparatus for carrying out the principle of my invention, which is here illustrated, I make a clear distinction between the opening in the bottom of the vessel or container of the glass and what I term the "discharge orifice;" that is to say, by the term "discharge orifice 2'," as shown in Figs. 1 to 9, inclusive, I make a distinction between that passage or orifice by which the glass leaves the mass of the glass within the vessel and after leaving the mass is relieved of the pressures or forces acting on the mass of the glass in the vessel,—such as, for example, pressure on the surface of the mass of glass in the containing vessel and also those gravity influences, which act through the mass of glass in the vessel, otherwise termed "head," on the one hand; and, on the other, that opening in the bottom of the vessel or any other openings that may carry the glass beyond the discharge point for any purposes whatever. The first passage or orifice I term, in this case, the "discharge orifice;" the second, I term merely the "opening in the bottom of the vessel."

For example, in the constructions shown in Figs. 1 to 9, inclusive, 2' is what I term the "discharge orifice;" whereas 2 is what I term the "opening of the vessel." In these figures, these two passages are separate and distinct from each other; whereas, in the forms shown in Figs. 10 and 11, this orifice and this opening are combined in common. But in considering the following description and the terms used in the claims, this clear distinction must be borne in mind.

It will be obvious that this condition of acceleration of the flow of glass down through the orifice caused by the suction in the pipe 3 will take place even though the pipe is slightly elevated in the opening, and even though the lower end of said pipe may be slightly elevated above the opening of the orifice in the upper side of the bottom of the tank or vessel as shown in Figs. 6 to 8. With the parts properly proportioned, it is clear that the sucking up action of the pipe 3 may take place in such way as simply to cause the acceleration of flow between the lower edge of the pipe and the edges of the orifice.

In using this apparatus, the glass flowing down through the orifice first assumes the more or less globular shape 6 shown in Fig. 1. At the same time that this initial flow takes place, a certain amount of glass may be drawn up into the tube 3, then as the flow continues out through the orifice 2 and when the globule 6 elongates, and thereby tends to become attenuated or thin, the glass in the tube 3 may be forced out as shown in Fig. 2 to fill in the center of the globule and cause the globule to assume substantially the form shown at 7, Fig. 2. Continued expulsion of the glass from the pipe 3, as illustrated in Fig. 3, causes the globule to maintain substantially a uniform diameter, as shown at 8, Fig. 3, so that we then have a mass of glass ready for discharge into a mold, or the like, which is of substantially uniform diameter and practically predetermined shape, and mass.

When now it is desired to cut off this globule to leave the same in the mold, the sucking action into the tube 3 may be resumed, as shown in Fig. 4, and may be made sufficiently rapid to cause a decided contraction in the globule at the point 9. It will be understood, however, that the flow of the glass down between the orifice 2 and the walls of the pipe 3 has not thus been checked, but after the glass has passed into and partially out of the orifice it is drawn up into the tube 3 instead of being supplied to the completed globule 10. The glass globule is then cut off at the point 9 in the ordinary manner. At this stage of the proceedings one of the principal advantages of this invention comes in, which is the taking care of the chilled part of the globule which is cut off by the cutting shears. It is obvious that the sucking action of the tube 3 draws upon the glass after it has flowed down past the lower end of said tube, and any of the glass which lies below the lower end of this tube tends to be sucked up into the tube under the action of the vacuum. This action, therefore, is illustrated in Fig. 5 in which it is seen that the lower end of the globule which follows the one cut off tends to be drawn up into the tube, and therefore the chilled portion 11 of the following globule which was that part which contacted with the shears when the first globule was cut off is drawn up into the tube 3. But at the same time, the glass continues to flow from the orifice of the vessel down and around the lower end of the tube 3, and consequently, this fresh flowing hot glass completely surrounds and incorporates the chilled part 11 into the center of its mass, or else so stretches and kneads the chilled part as to distribute or stretch it over the part of the surface of the drop removed from the point of the drop. By this stretching, the chilled part is re-heated by the body of the glass, so that when the second globule is forming and the glass is again expelled from the tube 3, this chilled portion will likewise be expelled into the center of the mass of the forming globule or stretches it over it, and will become assimilated and incorporated in such a way that it will not detrimentally affect the homogeneity of the glass in said globule. This assimilation, incorporation, or stretching of the chilled point of the flowing globule is entirely impossible where the mere plunger action hereinbefore described is employed to check the flow of glass, because the said plunger action is not sufficient to draw this chilled point up into or stretch it over the mass, but simply checks the flow sufficiently to allow slight condensation of the globule preparatory to being cut off. But when in the plunger action the checking of the flow is discontinued and normal action resumed, it will be found in the old plunger method described, the chilled spot or point of the glass will remain at the lower end of the globule, and will thus cause cracking and lack of homogeneity at one of the main critical points of the glass, as it comes to rest within the mold.

It will be seen, therefore, that by my method, while the flow of glass out through the orifice of the vessel may be accelerated beyond the normal rate at will, it cannot be checked to a point below the normal rate of flow.

By increasing the speed of glass either when rising or falling in the tube 3, a method is provided for increasing the normal rate of flow, and thus providing a regulating means for equalizing the variations due to changes in level of the glass in the container or due to changes of temperature in the glass, both of which would affect the normal flow from the reservoir out through the orifice.

In Figs. 6 to 8, inclusive, the vessel is again represented by the numeral 1,—the opening in the bottom of the vessel by the numeral 2,—and the confined or doughnut-shaped opening by the numeral 2'. It will be seen, however, from an inspection of Figs. 6 to 8 that the doughnut-shaped opening is now formed between the lower end of the tube and the upper edge of the outlet of the vessel. The action, however, here is the same as heretofore described in Figs. 1 to 5, inclusive.

Referring to Fig. 9, the parts remain the same as heretofore indicated in Figs. 6, 7 and 8, but in this figure is illustrated what would be the normal or natural flow of the glass through the confined or doughnut orifice 2', and the opening in the bottom of the vessel when the forces employed in carrying out my method of delivery are not in operation. This Fig. 9 clearly indicates the contract in the character of flow when the operating forces of my invention are suspended, and clearly indicates how the cross-section area of the gather is filled in or supplied, and the cross-section maintained by the operation of my invention. In other words, without the operation of the forces employed in carrying out my method, the glass would naturally flow in a tube or cylinderlike form, gradually attenuating as it is removed from the bottom of the vessel into a mere attenuated cylinder, and not in any sense a usable, solid drop of substantially uniform cross-section throughout.

In Fig. 10 is shown, a modified form of the apparatus using the same principle, but in this case the auxiliary member or pipe takes the form of a laterally extending passage 12 formed in an offset 13 of the reservoir 1, and connected by a passage 14 with the source of vacuum. The lower end 15 of this auxiliary passage adjoins that of the outlet 2 from the tank 1. In this case the auxiliary member of passage 12 takes the glass from and adds it again to the sides of the drop instead of feeding it directly to the center, but the chilled spot caused by the shearing off of the previous drop is effectively incorporated into the mass of the flowing mass or globule, and is furthermore removed from the lower end of the globule, which is the critical location when feeding the glass to a mold.

The invention herein described is not limited as regards the broad terms of the claims to any particular construction or arrangement of mechanical devices, whereby the rate of flow or shape of the drop are affected by forces acting on the glass at or outside of the container, so as to increase such normal flow by pulling the glass through the discharge or outlet.

There are two distinct characteristics of my invention: First,—that the normal flow can be increased by the force of tension acting on the flow at or after it leaves the outlet; and, second,—that the section of the stream or shape of the globule can be varied without stopping or reversing the normal flow from the supply reservoir in the discharge opening, and without varying either the pressure upon or height of the surface level of the glass in any part of the supply reservoir. On the contrary, the entire action takes place on the glass after it has flowed slightly beyond the mass of glass in the container and the force applied to the flowing glass is expended entirely on the glass after it has passed beyond the influence of the glass in the container.

While I have herein described particular forms of apparatus by which my invention may be carried out, it is to be understood that the invention is not limited in any manner to such apparatus, but that the apparatus and the means of carrying out the method may be varied to any desired extent within the scope of the appended claims.

What I claim is:

1. The method, as herein described, of forming a mass or gob of molten glass by continuously flowing from an orifice in a supply reservoir and adding to the mass or gob, portions of molten glass from an auxiliary member having a separate outlet, and combining the original and added portion in a suspended mass.

2. The method, as herein described, of forming a mass or gob of molten glass by continuously flowing from a supply reservoir, having an orifice, and by causing a portion of the molten glass to pass into an auxiliary member having a separate outlet, and combining the original and added portions in a suspended mass.

3. The method, as herein described, of forming a mass or gob of molten glass by flowing from a supply reservoir having an orifice and simultaneously passing molten glass from an auxiliary member having a separate outlet, and combining the original and added portions in a suspended mass.

4. The method, herein described, of forming a mass or gob of molten glass by flowing from a supply reservoir having an outlet, adding to the mass or gob molten glass flowing from an auxiliary member having a separate outlet, stopping the flow from auxiliary member and taking from the mass or gob a portion of molten glass by causing said portion to flow into auxiliary member.

5. The method, herein described, of forming a mass or gob of molten glass by flowing partly from an orifice in a supply reservoir whose surface of molten glass is approximately constant in level, and simultaneously flowing partly from an auxiliary reservoir having a separate outlet and a surface of molten glass of varying level, and combining the original and added portions in a suspended mass.

6. The method, herein described, of forming a mass or gob of molten glass by continuously flowing from a reservoir through an orifice and accelerating by fluid pressure the flow of glass through the orifice without causing variation of level of any portion of the surface of the glass within the supply reservoir.

In testimony whereof I, the said GEORGE E. HOWARD, have hereunto set my hand.

GEORGE E. HOWARD.

Witnesses:
JOHN F. WILL,
LEO ROBESH.